(12) United States Patent
Nadeau

(10) Patent No.: US 6,999,379 B2
(45) Date of Patent: Feb. 14, 2006

(54) PERSONAL PROTECTIVE DEVICE AND METHOD OF USING THE SAME

(76) Inventor: Justin P. Nadeau, 17 Beachwood St., Fairhaven, MA (US) 02719

(*) Notice: Subject to any disclaimer, the term of this patent is extended or adjusted under 35 U.S.C. 154(b) by 0 days.

(21) Appl. No.: 10/610,491

(22) Filed: Jun. 30, 2003

(65) Prior Publication Data

US 2004/0008581 A1 Jan. 15, 2004

Related U.S. Application Data

(60) Provisional application No. 60/392,009, filed on Jun. 28, 2002.

(51) Int. Cl.
*H04B 1/02* (2006.01)

(52) U.S. Cl. ............................................. 367/139
(58) Field of Classification Search ............. 367/139; 119/220, 719, 908; 43/17.1; 702/139; 340/384.2
See application file for complete search history.

(56) References Cited

U.S. PATENT DOCUMENTS

| | | | | | |
|---|---|---|---|---|---|
| 3,317,889 | A | * | 5/1967 | Barrand | 367/139 |
| 4,566,085 | A | * | 1/1986 | Weinberg | 367/139 |
| 5,177,891 | A | * | 1/1993 | Holt | 43/17.1 |
| 5,570,322 | A | * | 10/1996 | Miller | 367/139 |
| 5,610,876 | A | * | 3/1997 | Jeffers | 367/139 |
| 5,778,591 | A | * | 7/1998 | Oschman et al. | 43/17.1 |
| 5,883,858 | A | * | 3/1999 | Holt | 367/139 |
| 6,606,963 | B1 | * | 8/2003 | Wynne | 119/220 |

FOREIGN PATENT DOCUMENTS

CA 2091043 * 9/1994

OTHER PUBLICATIONS

Davies, D.H. 1962. Note on the use of killer whale sounds as a shark repellent. S Afr Assoc Mar Biol Res Bull 3 : 32–33.*

* cited by examiner

*Primary Examiner*—Daniel Pihulic
(74) *Attorney, Agent, or Firm*—Whiteford, Taylor & Preston; Jeffrey C. Maynard; Gregory M. Stone

(57) ABSTRACT

A marine and land transmission detraction and deterrence device designed to protect swimmers, scuba divers, surfers, hikers, hunters, campers and other individuals engaged in water and/or land activities from attacks by sharks as well as from attacks from other marine and land predators of human beings. The device emits a high frequency pitch in varying sequential intervals that is easily heard and recognized by sharks and/or by other targeted land and marine human predators. The personal protective device includes a sound generator for reproducing a sound known to repel predators; a piezoelectric speaker; and a power supply for supplying electrical energy to the sound generator and speaker contained in a waterproof package.

19 Claims, 1 Drawing Sheet

PERSONAL PROTECTIVE DEVICE AND METHOD OF USING THE SAME

CROSS REFERENCE TO RELATED APPLICATION

This application is based upon and claims benefit of copending and co-owned U.S. Provisional Patent Application Ser. No. 60/392,009 entitled "Orca", filed with the U.S. Patent and Trademark Office on Jun. 28, 2002 by the inventor herein, the specification of which is incorporated herein by reference.

BACKGROUND OF THE INVENTION

1. Field of the Invention

The present invention relates to a personal protective device for repelling predators and more particularly pertains to driving away predators in an area with a sound generation device.

2. Background of the Prior Art

Swimmers, scuba divers, hikers, hunters, and campers sometimes find themselves in an environment containing land or marine animals that are known to prey on humans. Although noisemaking on land is often sufficient to repel some land predators, the splashing and movement of waterborne activity tends to attract some marine predators, such as sharks.

Attempts have been made in the past to use acoustic devices to attempt to control land and marine animals. Generally, the devices heretofore devised and utilized for the purpose of repelling land and marine animals have consisted of fixed or ship-mounted devices for generating sound or vibration using a variety of mechanisms, such sound or vibration being intended to repel or control the behavior of such land or marine animals, including the following:

U.S. Pat. No. 3,317,889, issued to Stanley Barrand, discloses an apparatus for repelling sharks by vibrating a line at specified frequency that generates a sound to repel sharks.

U.S. Pat. No. 4,566,085, issued to Stanley Weinberg, discloses an ultrasonic sound generator for producing bursts of sound to eradicate vermin and pests from a desired space.

U.S. Pat. No. 5,570,322, issued to Michael T. Miller, discloses a barracuda-repelling sound generation device that generates and transmits sounds and light that are purportedly irritating to barracudas.

U.S. Pat. No. 5,610,876, issued to Robert K. Jeffers, discloses an acoustic deterrent system and method for repelling marine mammals from a region of water. High frequency (7–10 kHz) acoustic signals starting at a low level are gradually or incrementally increased to a level beyond the mammals' pain threshold.

Notably, the prior art devices have comprised rather complex constructions, often large in size making them unsuitable for use as a personal protection device that a user may individually carry and actuate as they see is necessary. Moreover, none of the above-noted references disclose an easily transportable, personal protective device that can be worn on a person to repel an animal that is a predator to humans, or that uses piezoelectric speaker technology and prerecorded sounds of predators to such animals to repel such animals away from human beings.

SUMMARY OF THE INVENTION

The present invention provides a solution to the above and other problems by enabling a simply designed, easy to construct, personally wearable, and inexpensive personal protective device that can selectively be worn either on a person's wrist or attached to any part of the human body or marine or land equipment, such as surfboards, flotation devices, and camping gear.

It is, therefore, an object of the present invention to enable a personal protective device for repelling predators, and method of using the same, that avoids the disadvantages of the prior art.

It is another object of the present invention to enable a personal protective device that is compact and portable. A related object is to enable a personal protective device that can be worn by a person, such as in a manner similar to a wristwatch.

It is another object of the present invention to enable a personal protective device for repelling predators having a simple design. It is a related object of the present invention to enable a personal protective device using piezo technology that is of durable and reliable construction.

It is another object of the present invention to enable a personal protective device that may be easily and efficiently manufactured and marketed. A related object of the present invention is to enable a personal protective device that is susceptible of a low cost of manufacture with regard to both materials and labor, and which accordingly is then susceptible of low prices of sale to the consuming public, thereby making such a personal protective device economically available to the buying public.

It is another object of the present invention to enable a personal protective device comprising a sound generator for reproducing a sound known to repel predators; a piezoelectric speaker; and a power supply for supplying electrical energy to the sound generator and speaker.

In accordance with the above and other objects, a personal protective device is described for providing a marine and/or land transmission detraction and deterrence device designed to protect swimmers, scuba divers, surfers, hikers, hunters, campers and: other individuals engaged in water and/or land activities from attacks by marine or land predators of human beings. With regard to a particularly preferred embodiment of the invention, the device emits a high frequency pitch in varying sequential intervals that is easily heard, and more particularly is recognized, by sharks and/or by other targeted land and marine predators of humans. In the case of sharks, for example, a high pitch sound emitted by the device either is of natural sound recordings or of computer generated replica sounds preferably of pods of Killer. Whales. Optionally, other sounds known or discovered to be recognizable by and effective in deterring sharks from menacing or attacking human beings may be utilized. The sound emitted by the device can be selectively modified to target other marine and land predators.

BRIEF DESCRIPTION OF THE DRAWINGS

The above and other features, aspects, and advantages of the present invention -are considered in more detail, in relation to the following description of embodiments thereof shown in the accompanying drawings, in which.

DETAILED DESCRIPTION OF THE INVENTION

Figure 1:
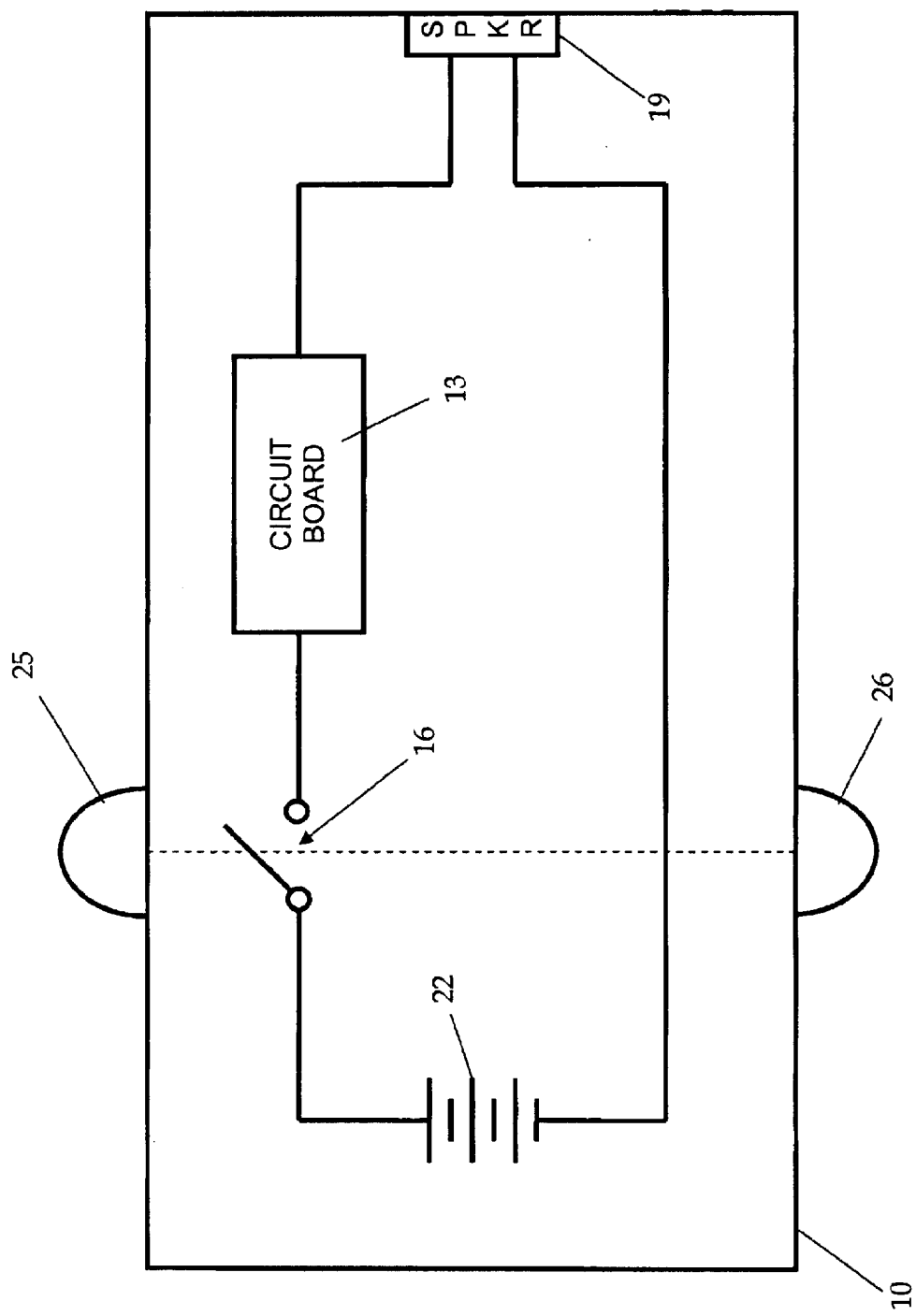
FIG. 1 illustrates a block diagram of device having circuitry according to one embodiment of the present invention.

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Referring to FIG. 1, a personal protective device of the present invention is constructed preferably in a portable, waterproof container 10. A miniature circuit board 13 is disposed within the container 10, having a sound generator and control circuitry. In a first embodiment of the invention, the sound generator produces digitally synthesized sounds of one or more feeding killer whales. Killer whale feeding sounds are recorded in the wild and the recorded sounds are converted to a digital sound signal. The recorded killer whale sound is digitized, edited, and enhanced to produce digitally synthesized killer whale sounds. The sound produced by the sound generator preferably is a digitally remastered, man-made sound recorded on a computer chip that is virtually identical to the natural recording. Approximately 5 to 10 seconds of sound is recorded on the computer chip.

The control circuitry is responsive to an input switch 16 that energizes such miniature circuit board 13. Switch 16 has an enabled orientation for allowing the circuit board 13 to be electrically energized and a disabled orientation for preventing the circuit board 13 from being electrically energized. When energized, the control circuitry directs the sound generator to produce the recorded sound. When the sound is finished playing, the control circuitry directs the sound generator to replay the recorded sound as long as the circuit board remains energized. In an alternate embodiment, the computer chip can have multiple sounds from different predators recorded thereon. In such an embodiment, a means for selecting the desired sound to be produced by the sound generator is provided.

A piezoelectric speaker 19 is electrically connected to the sound generator on miniature circuit board 13. The piezoelectric speaker 19 projects the sound output from the sound generator. The projected sound should be of sufficient volume to be heard by a predator at a safe distance from the user. Such a safe distance varies with the predator being deterred. In a preferred embodiment, the speaker generates a sound in the range of 120 to 190 decibels. Greater or lesser volume sound can be used as required by a particular application. The piezoelectric speaker is commercially available and allows the device to be built in a small, compact container, and may be operated by a minimal power source, thus enabling the speaker to be incorporated in a personal protection device capable of being worn by a user. One such manufacturer of piezoelectric devices is Piezo Systems, Inc. of Cambridge, Mass.

A battery 22, such as a standard wristwatch battery, is disposed within the container 10. Battery 22 supplies electrical energy for operation of the device. When the device is activated, the battery power will travel through switch 16 and energizes the miniature circuit board 13, which houses the sound generator containing the sound for broadcasting. The sound generator begins transmitting the prerecorded sound through the piezoelectric speaker 19. The battery is conventional in design and commercially available, such as Casio, Energizer, or Duracell wristwatch batteries. The battery may be replaced when its electrical energy has been expended.

Mounted on the exterior of the waterproof container 10 may be two pushbuttons. A first pushbutton 25 turns the device on by placing switch 16 in the enabled orientation. A second pushbutton 26 turns the device off by placing switch 16 in the disabled orientation.

In a preferred embodiment, the personal protective device of the present invention is easily transportable, fully self-contained, and small enough to be worn by the user. The device is constructed in a small, waterproof enclosure using piezoelectric speaker technology, which is the same type of technology used in small speaker devices, such as talking wristwatches and small personal alarms. In the instance of protection from sharks, for example, the piezoelectric speaker technology used in the device may utilize a natural recording of a natural predator of sharks. For example, in one preferred embodiment, the natural recording may comprise the sounds of a well-known pod of Killer Whales known as the R-Pod. By reproducing the series of cries and clicks made by members of the R-Pod while feeding, the device may serve to alert any shark or marine predator that killer whales are feeding nearby, causing the shark or marine predator to retreat.

In operation, a small watch battery powers the internal components of the device. When activated, the protective device preferably emits a 4 to 10 kilowatt chirp through a piezoelectric speaker preferably ranging between 120 and 190 decibels to scare away a potential predator. It has been found that such decibel range is preferable for particularly transmitting the recordings of Killer Whales described above the desired distance of 30 to 100 meters. Notably, depending on the desired range of sound transmission and whether such transmission will be through water or through air, the power and volume transmitted can be varied, so long as an overall transmission range of preferably between 30 and 100 meters is maintained. The emitted sounds preferably last approximately 3–5 seconds and will be continuously repeated as long as the device is energized. The amount of the recorded sound may be of any length provided it can be stored on a computer chip mounted on the miniature circuit board contained in the device.

Once again, such transmission preferably causes the sound to be projected underwater for a distance between 30 and 100 meters. The sound needs to be powerful enough to travel a sufficient distance through the water to reach its intended target for deterrence. The length of travel of the sound in water is dependent upon the power of the transmission and the water conditions. In general, more power projected into the water will travel a longer distance. Consequently, the further the sound will travel, the greater reaching the deterrent effect on a predator. Thus, it should be noted that the power of transmission may be adjusted depending upon the medium in which the sound must travel so as to maintain a transmission distance of preferably between 30 and 100 meters.

The protective device is preferably constructed of a durable and waterproof outer shell and may be worn as a wrist/diving watch, or in any manner which will enable it to be attached to any part of the human body or marine or land equipment, such as surfboards, flotation devices, and camping gear.

In an alternate embodiment, the device can be modified using other natural sounds such as the sounds of bottle-nosed Dolphins, Sperm Whales, Humpback Whales and other like marine mammals and marine carnivores that are known to attack sharks or other marine predators. It can also be modified to use other sounds as deterrents to other predators of human beings. Such modification may be performed either by use of a different computer chip having a different recording or by using a variable selectable sound stored on a single chip. Similar piezoelectric speaker technology and interval sound transmission, sequential or otherwise, may be specifically designed to target other land and marine predators of human beings.

The invention has been described with references to a preferred embodiment. While specific values, relationships, materials and steps have been set forth for, purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A personal protective device for repelling predators, comprising:
   a circuit board, comprising:
     (1) control circuitry;
     (2) a sound generator comprising a plurality of sounds recognized by animals that are predators of human beings as sounds of predators of such animals; and
     (3) a switch operatively connected to said circuit board to selectively enable a preferred sound;
   a piezoelectric speaker;
   a power supply in electrical communication with said circuit board to enable the supply of electrical energy for operation; and
   a switch for selectively supplying electrical energy to the circuit board;
   wherein the circuit board, piezoelectric speaker, power supply, and switch are encased in a waterproof container.

2. The personal protective device according to claim 1, the sound generator further comprising:
   a computer chip having said plurality of sounds recorded thereon.

3. The personal protective device according to claim 2, wherein:
   the recorded sound comprises the sound of a pod of killer whales feeding.

4. The personal protective device according to claim 2, wherein:
   the recorded sound comprises a digitally synthesized sound of a pod of killer whales feeding.

5. The personal protective device according to claim 2, wherein:
   the recorded sound comprises sound of a marine animal selected from the group consisting of:
   bottle-nosed dolphins;
   sperm whales;
   humpback whales; and
   marine carnivores known to attack sharks.

6. The personal protective device according to claim 1, wherein:
   the control circuitry directs the sound generator to produce a sound when the circuit board is energized and directs the sound generator to continuously replay the sound as long as the circuit board remains energized.

7. The personal protective device according to claim 1, wherein:
   the power supply comprises a battery.

8. The personal protective device according to claim 1, further comprising:
   means for wearing the waterproof container on a human being.

9. The personal protective device according to claim 8, wherein:
   the means for wearing the waterproof container on a human being comprises a wrist strap.

10. The personal protective device according to claim 1, further comprising:
    means for attaching the waterproof container to equipment selected from the group consisting of:
    boats;
    surfboards;
    floatation devices;
    marine equipment;
    tents;
    backpacks;
    tools; and
    camping equipment.

11. The personal protective device according to claim 1, wherein:
    the piezoelectric speaker emits a sound sufficient to repel known predators.

12. The personal protective device according to claim 1, wherein:
    the piezoelectric speaker emits a sound between approximately 120 decibels and approximately 190 decibels.

13. The personal protective device according to claim 1, wherein:
    the sound produced by the piezoelectric speaker is transmitted through water for a distance of at least 30 meters.

14. The personal protective device according to claim 1, further comprising:
    a first pushbutton to turn the device on by placing the switch in an enabled orientation.

15. The personal protective device according to claim 14, further comprising:
    a second pushbutton to turn the device off by placing the switch in a disabled orientation.

16. A method of repelling predators of humans, the method comprising the steps of:
    a. donning a personal protective device comprising:
       a circuit board, said circuit board further comprising control circuitry and a sound generator comprising a plurality of sounds recognized by animals that are predators of human beings as sounds of predators of such animals; and a switch operatively connected to said circuit board to selectively enable a preferred sound;

a piezoelectric speaker;

a power supply in electrical communication with said circuit board to enable the supply of electrical energy for operation; and a switch for selectively supplying electrical energy to the circuit board;

b. traveling to an area where first animals that are predators of humans are present; and c. causing said personal protective device to play a recording of sounds of second animals that are predators of said first animals at sufficient amplitude to repel said first animals away from said personal protective device.

17. The method of claim 16, wherein said recording is played at an amplitude of between approximately 120 decibels and approximately 190 decibels.

18. The method of claim 16, wherein said recording is played at an amplitude sufficient to transmit said sounds a distance of at least 30 meters.

19. A method of protecting humans from predatory animals, the method comprising the steps of:

a. providing a personal protective device comprising:

a circuit board, said circuit board further comprising control circuitry and a sound generator comprising a plurality of sounds recognized by animals that are predators of human beings as sounds of predators of such animals; and a switch operatively connected to said circuit board to selectively enable a preferred sound;

a piezoelectric speaker;

a power supply in electrical communication with said circuit board to enable the supply of electrical energy for operation; and a switch for selectively supplying electrical energy to the circuit board; and b. instructing a user of said personal protective device to cause said personal protective device to play a recording of sounds of first animals that are predators of second animals at sufficient amplitude to repel said second animals away from said personal protective device after said user has traveled to an area where said second animals are present, wherein said second animals are predators of humans.

* * * * *